(12) United States Patent
Lu et al.

(10) Patent No.: US 12,154,026 B2
(45) Date of Patent: Nov. 26, 2024

(54) DEEP NEURAL NETWORK HARDWARE ACCELERATOR BASED ON POWER EXPONENTIAL QUANTIZATION

(71) Applicant: SOUTHEAST UNIVERSITY, Suzhou (CN)

(72) Inventors: Shengli Lu, Jiangsu (CN); Wei Pang, Jiangsu (CN); Ruili Wu, Jiangsu (CN); Yingbo Fan, Jiangsu (CN); Hao Liu, Jiangsu (CN); Cheng Huang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 883 days.

(21) Appl. No.: 17/284,480

(22) PCT Filed: Jan. 9, 2020

(86) PCT No.: PCT/CN2020/071150
§ 371 (c)(1),
(2) Date: Apr. 12, 2021

(87) PCT Pub. No.: WO2020/258841
PCT Pub. Date: Dec. 30, 2020

(65) Prior Publication Data
US 2021/0357736 A1 Nov. 18, 2021

(30) Foreign Application Priority Data
Jun. 25, 2019 (CN) .......................... 201910554531.8

(51) Int. Cl.
*G06N 3/06* (2006.01)
*G06F 5/01* (2006.01)
(Continued)

(52) U.S. Cl.
CPC .............. *G06N 3/063* (2013.01); *G06F 5/01* (2013.01); *G06F 7/552* (2013.01); *G06F 7/556* (2013.01); *G06F 9/5027* (2013.01)

(58) Field of Classification Search
CPC ..................................................... G06N 3/063
See application file for complete search history.

(56) References Cited

U.S. PATENT DOCUMENTS

| 2018/0046894 | A1* | 2/2018 | Yao | .......................... G06N 3/045 |
| 2018/0341495 | A1* | 11/2018 | Culurciello | ........... G06F 9/3895 |
| 2020/0097442 | A1* | 3/2020 | Jacob (Yaakov) | .. G06F 15/8046 |

FOREIGN PATENT DOCUMENTS

| CN | 107704916 | 2/2018 |
| CN | 109284822 | 1/2019 |

(Continued)

OTHER PUBLICATIONS

Alessandro Aimar, "NullHop: A Flexible Convolutional Neural Network Accelerator Based on Sparse Representations of Feature Maps", IEEE, 2018 (Year: 2018).*

(Continued)

*Primary Examiner* — Van C Mang
(74) *Attorney, Agent, or Firm* — JCIP GLOBAL INC.

(57) ABSTRACT

A deep neural network hardware accelerator comprises: an AXI-4 bus interface, an input cache area, an output cache area, a weighting cache area, a weighting index cache area, an encoding module, a configurable state controller module, and a PE array. The input cache area and the output cache area are designed as a line cache structure; an encoder encodes weightings according to an ordered quantization set, the quantization set storing the possible value of the absolute value of all of the weightings after quantization. During the calculation of the accelerator, the PE unit reads data from the input cache area and the weighting index cache area to perform shift calculation, and sends the calculation result to the output cache area. The accelerator uses shift operations to replace floating point multiplication operations, reducing the requirements for computing resources, storage resources, and communication bandwidth, and increasing the calculation efficiency of the accelerator.

6 Claims, 4 Drawing Sheets

(51) Int. Cl.
    *G06F 7/552*     (2006.01)
    *G06F 7/556*     (2006.01)
    *G06F 9/50*     (2006.01)
    *G06N 3/063*     (2023.01)

(56) References Cited

FOREIGN PATENT DOCUMENTS

| | | |
|---|---|---|
| CN | 109359735 | 2/2019 |
| CN | 109598338 | 4/2019 |
| CN | 110390383 | 10/2019 |

OTHER PUBLICATIONS

Song Han, "Deep Compression: Compressing Deep Neural Networks With Pruning, Trained Quantization and Huffman Coding", 2016 (Year: 2016).*

Lu, "FlexFlow: A Flexible Dataflow Accelerator Architecture for Convolutional Neural Networks", IEEE, 2017 (Year: 2017).*

International Search Report (Form PCT/ISA/210) of PCT/CN2020/071150 mailed on Apr. 10, 2020, with English translation thereof, pp. 1-5.

\* cited by examiner

DEEP NEURAL NETWORK HARDWARE ACCELERATOR BASED ON POWER EXPONENTIAL QUANTIZATION

CROSS-REFERENCE TO RELATED APPLICATION

This application is a 371 of international application of PCT application serial no. PCT/CN2020/071150, filed on Jan. 9, 2020, which claims the priority benefits of China Patent Application No. 201910554531.8, filed on Jun. 25, 2019. The entirety of each of the above mentioned patent applications is hereby incorporated by reference herein and made a part of this specification.

TECHNICAL FIELD

The present invention discloses a deep neural network hardware accelerator based on power exponential quantization, relates to a processor structure for hardware acceleration for convolutional calculation of deep neural network, and belongs to the technical field of calculation, reckoning and counting.

DESCRIPTION OF RELATED ART

In recent years, artificial intelligence has infiltrated into various aspects of life and brought great influences on the world economy and social activities. Deep learning is one of the most focused areas in machine learning research and widely applied in mainstream artificial intelligence algorithms. As one of the techniques of deep learning, deep convolutional neural network (DCNN) is now widely applied in many artificial intelligence (AI) applications, and has made some remarkable achievements in technical fields such as computer vision, speech recognition and robots, especially in image recognition.

A deep convolutional neural network (DCNN) often has billions of or even tens of billions of parameters, so the performance of DCNN in accuracy is superior to other existing machine learning algorithms. However, owing to the extremely high requirements of DCNN for computing power and storage, it is difficult to implement a DCNN on small devices with limited resources, such as mobile communication devices, Internet of Things devices, wearable devices and robots, etc. In order to reduce the requirement for computing, storage and communication bandwidth, some researchers have made great efforts to compress the CNN model, trying to train the CNN model with low-precision data. BinaryNet, XNOR-net and DeRaFa-net are all compressed CNN models. However, the compressed models still involve floating-point precision data, and are not particularly favorable for hardware design. A hardware-friendly quantization scheme is to quantize the model data into the form of powers of two. It is proven in practice that a CNN model can be quantized down to a 3-bit model without any significant loss in accuracy by using a logarithmic data representation. In addition, the researchers have put forward an incremental network quantization scheme, which quantifies a CNN model down to a 4-bit model without any precision degradation. A quantization scheme that quantizes the CNN model data into the form of powers of two can transform most multiply operations that have a high computing requirement into effective bit-by-bit shift operations, which reduces the requirements for computing and storage. The present application aims to propose a neural network hardware accelerator using that quantization scheme, so as to simplify the implementation of shift operations in hardware design, and thereby reduce the consumption of hardware resources by complex multiply operations of a deep neural network.

SUMMARY

To overcome the above-mentioned drawbacks in the prior art, the present invention provides a deep neural network hardware accelerator based on power exponential quantization, which is a hardware accelerator for shift operations designed on the basis of the result of power exponential quantization of the parameters of a neural network, avoids the use of a complex multiplying circuit for the implementation of floating-point multiplication operations, reduces the power consumption and chip area of the processor, and solves the technical problem that the existing processors for implementing the convolution calculation of a deep neural network have complex circuit, need huge storage space, and have high power consumption.

The above-mentioned object of the present invention is attained with the following technical scheme:

A deep neural network is trained with an incremental network quantization method, and the weights are quantized into the form of powers of two (accomplished by software), so that the multiplication operations of the neural network can be realized by shifting. The hardware accelerator comprises an AXI-4 bus interface, an input cache area, an output cache area, a weight cache area, a weight index cache area, an encoding module, a configurable state controller module and a processing element (PE) array. The PE array contains R*C PE units, each of which replaces floating-point multiplication operation with binary shift operation; the input cache area and the output cache area are designed as a row cache structure respectively, the input cache area and the weight cache area are configured to cache the input data which are read from external memory DDR via an AXI-4 bus and the weight data which have been subjected to power exponential quantization, and the accelerator can be mounted via the AXI-4 bus to any bus device that uses the AXI-4 protocol interface; the output cache area is configured to cache the calculation results generated from the PE array; the configurable state controller module is configured to control the working state of the accelerator and realize switching among the working states; the encoder encodes the quantized weight data according to an ordered quantization set to obtain weight index values that indicate whether the weights are positive or negative and indicate the position information of the weights in the ordered quantization set, and the ordered quantization set stores the possible absolute values of all quantized weights (in the form of powers of two). During the calculation of the accelerator, the PE unit reads data from the input cache area and the weight index cache area to perform calculation, and then sends the calculation results to the output cache area.

Since multiplication operations are replaced with shift operations in the design, the multiplier DSP is seldom used, the hardware resources are sufficient, and the systolic array has a high degree of parallelism, thereby the throughput of the accelerator can be improved greatly. Therefore, the PE array is designed in the form of a systolic array. The data are loaded from the input cache area to the leftmost column of the PE array, and the input data is shifted to the right by one step in each clock cycle; the PE array outputs different points of the same output channel in parallel for each column and outputs the data of different output channels for different columns.

The PE unit utilizes the weight index value to judge whether the quantized value of weight data is positive or negative and determines the number of bits of shifting and the shift direction of the input data; the quantized value of weight data is positive if the weight index value is positive; then the PE unit searches for a shift table (the data in the shift table are determined by the indexes of the powers of two in the ordered quantization set, and is sorted in the same order as the data in the quantization set) according to the absolute value of weight index, so as to determine the shift direction and the number of bits of shifting.

Based on the above technical scheme, the number of rows in the input cache area is determined by the size of the convolution kernel on the current layer of the deep neural network, the step size of the convolution kernel, and the size of the outputted feature map.

Based on the above technical scheme, the data range of the ordered quantization set is determined by the weight quantization precision and the maximum value among the unquantized absolute weight values. The data in the ordered quantization set is sorted in a certain order, and the stored values are quantized absolute values. For example, if the weights are quantized into 5-bit values, the quantization set may be $\{2, 0, 2^{-1}, 2^{-2}, 2^{-3}\}$.

Based on the above technical scheme, the direction and magnitude of shifting during shift operation of the input data are determined according to the shift table stored in the PE unit; specifically, the input data is left-shifted if the corresponding value in the shift table is positive, or the input data is right-shifted if the corresponding value in the shift table is negative; the absolute values of the elements in the shift table represents the magnitude of shifting. Shift operation is directly carried out if the weight index value is positive; or the input data is inverted and then shift operation is carried out if the weight index value is negative.

Based on the above technical scheme, the weight index value obtained after encoding consists of two parts: sign and index, wherein the sign indicates whether the quantized weight data is positive or negative, and the index indicates the position of the absolute value of weight data in the ordered quantization set.

Based on the above technical scheme, the AXI-4 bus interface assembles multiple data items into one data item for transmission, so as to improve the operation speed.

With the above-mentioned technical scheme, the present invention attains the following beneficial effects:

(1) In the present invention, multiplication operations are replaced with shift operations during calculation of the accelerator, and binary shift operations are realized by means of a systolic PE array; thus, the present invention avoids using a complex multiplying circuit, reduces the requirements for computing resources, storage resources and communication bandwidth, and thereby improves the computing efficiency of the accelerator;

(2) The PE units look up a shift table of indexes of quantized power exponent for binary shift operations, as is easy to implement in hardware occupying less area; thus, the consumption of hardware resources is reduced, the energy consumption is reduced, and high computing performance is realized;

(3) The hardware accelerator described in the present application can be applied to a neural network based on power exponential quantization, so that the traditional floating-point multiplication operations are replaced by binary shifting convolutional calculation on the basis of the result of power exponential quantization; thus the amount of computation of convolutional calculation is reduced, the precision of the parameters of the neural network is decreased, thereby the storage space required for the parameters of the neural network is reduced, the computing speed of the neural network is improved, while the consumption of hardware resources by the complex calculations of the neural network is reduced. Therefore, it is possible to apply the compressed neural network on the hardware of small embedded terminal devices or the like.

DETAILED DESCRIPTION OF THE INVENTION

Hereunder the technical scheme of the present invention will be detailed, with reference to the accompanying drawings.

Figure 1:
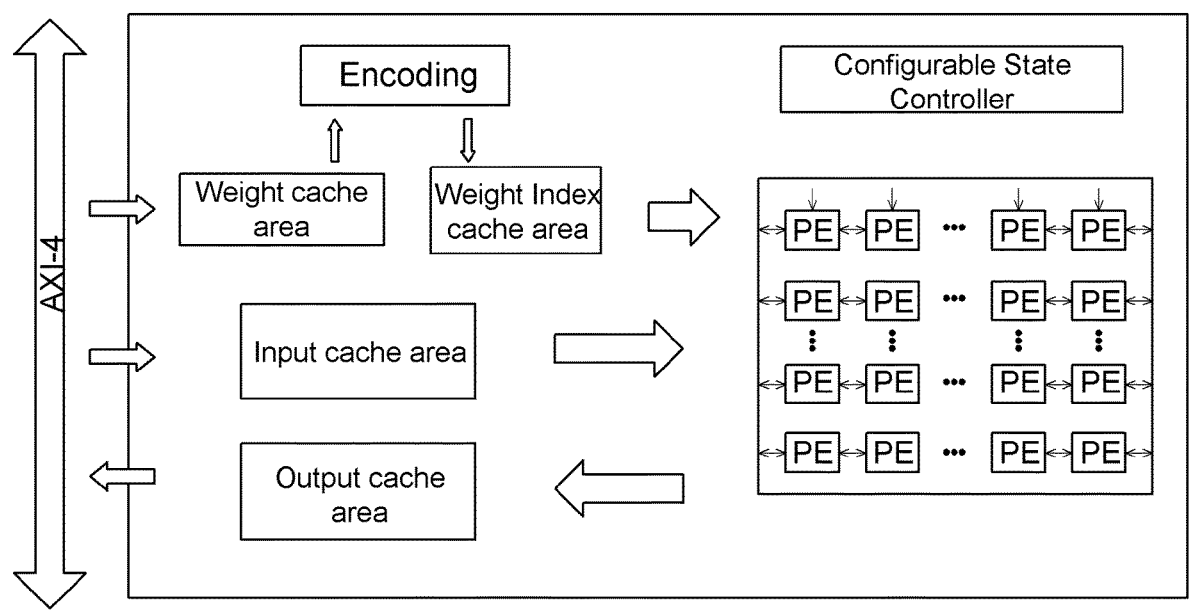
FIG. 1 is a schematic structural diagram of the hardware accelerator disclosed in the present invention.

The hardware structure of the deep neural network accelerator designed in the present invention is shown in FIG. 1. Hereunder the working principle of the deep neural network accelerator will be described in an example with a PE array in size of 16*16, with a convolution kernel in size of 3*3 and convolution stride size=1: the accelerator caches the input data and the weight data after power exponential quantization into the input cache area and the weight cache area via the AXI-4 bus; according to the size of the PE array, the AXI-4 bus reads 16 convolution kernel data items from the DDR and stores them in the weight cache area, so that 16 weight index values can be inputted in parallel to the PE array. The convolution kernel data stored in the weight cache area is read to the encoder module, where the weight data is encoded according to whether the weight data after power exponential quantization is positive or negative and according to the positions in the ordered quantization set, so as to carry out shift operations in the PE units. In the calculation, the input cache area outputs 16 data items in parallel per row to the first PE unit in each row of the PE array for calculation, then the data items are transferred to the adjacent PE units in each column sequentially, and the input data is cached in the input sub-cache area of each PE unit; the weight index values are inputted in parallel via 16 weight index sub-buffer areas to the first PE unit in each column of the PE array, and then the weight index values are transferred to the adjacent PE units in each column sequentially, and finally are cached in the weight index sub-cache area of PE unit. Each PE unit reads the weight index value from its weight index sub-cache area, and determines the direction and magnitude of data shifting by looking up a table, i.e., looking up the established shift table.

Figure 2:
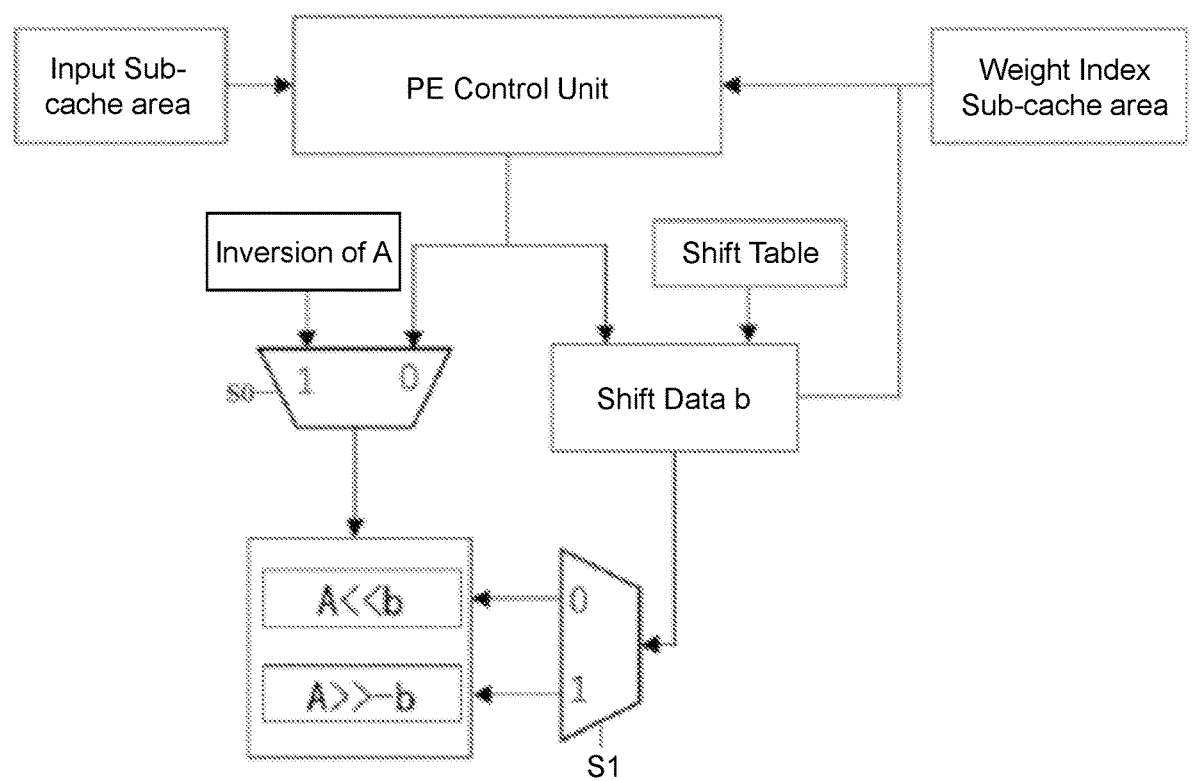
FIG. 2 is a schematic structural diagram of the PE unit disclosed in the present invention.

Each PE unit is shown in FIG. 2. The input data is cached in the input sub-cache area, and the encoded convolution kernel data (weight index values) is cached in the weight index sub-cache area; the PE control unit generates flag bits S1S0 for configuring the shift operation mode of the PE unit according to the weight index information, wherein the flag bit S0 that indicates an inversion operation is generated according to whether the weight is positive or negative, and the flag bit S1 that indicates the shift direction is generated according to the position information of the weight in the ordered quantization set; then the data is read from the weight index sub-buffer area and the input sub-buffer area for data processing; the shift table is looked up according to the absolute weight index value, and the direction and magnitude of shifting in the shift operation of the input data are determined. The PE unit is configured with two flag bits S1 and S0, wherein S0=0 indicates that the weight is negative, and, in that case, the data opposite to data A in sign is used in the shift operation; otherwise data A is directly used in the shift operation; S1=0 indicates that the corresponding value b in the shift table is positive, and, in that case, the data b is outputted to a data left-shift unit for shift operation; S1=1 indicates that the value b is negative, and, in that case, the data b is outputted to a data right-shift unit for shift operation. The absolute value corresponding to the shift data b represents the magnitude of shifting.

Figure 3:
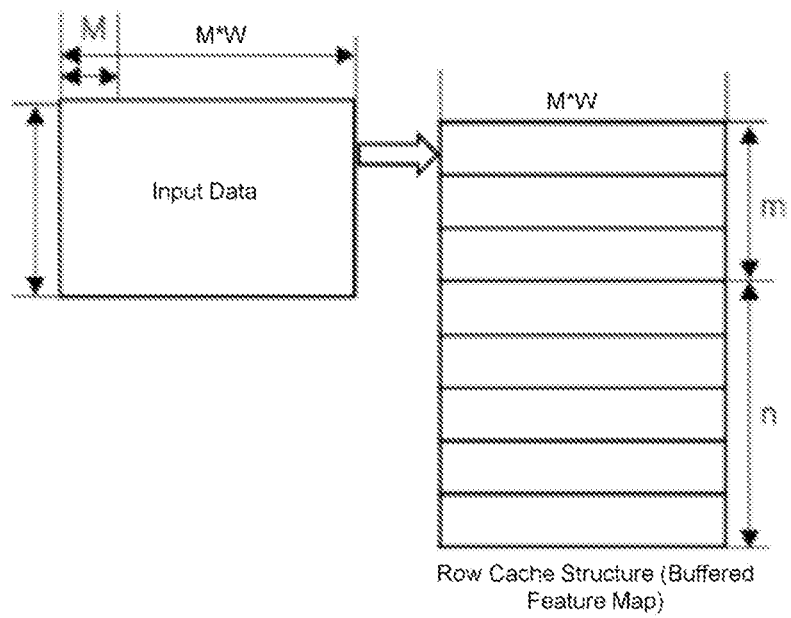
FIG. 3 is a schematic diagram of the row cache structure.

The input cache area and the output cache area employ a row cache structure shown in FIG. 3. When the input feature map is stored in the input cache area in blocks, adjacent blocks share (r−1)*n data items, wherein r is the number of columns of the convolution kernel, and n is the number of rows of the input feature map divided into blocks. In order to reuse the data, n+m row cache areas (m is convolution stride size) are arranged on the on-chip memory, and the data in each input row cache area is M*W, wherein M represents the number of channels of the input feature map and W represents the width of the input feature map; the data in each output row cache area is N*C, wherein N represents the number of channels of the output feature map and C represents the width of the output feature map. The row cache area is a circular buffer, from which the accelerator reads n rows of data for calculation, and the accelerator reads data from the external memory DDR to the remaining m rows of cache areas at the same time, and the calculation of n rows of data is carried out in parallel to the caching of m rows of data. After the calculation of n rows of data is completed, the accelerator skips m rows of data and continues to read the next n rows of data for calculation, while the skipped m rows are overwritten by external data.

Figure 4A:
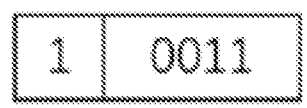
FIG. 4A is a schematic diagram of weight encoding.
Figure 4B:
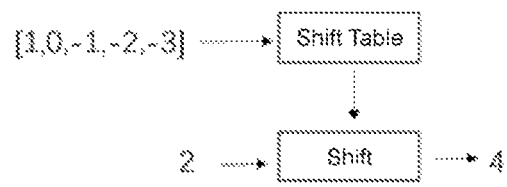
FIG. 4B is a schematic diagram of a method of looking up a table of weight index values.

The encoded convolution kernel data (weight index value) consists of two parts: a sign as shown in FIG. 4A and an index as shown in FIG. 4B, wherein the sign indicates whether the weight data after power exponential quantization is positive or negative, while the index indicates the position of the weight data after power exponential quantization in the ordered quantization set. The direction and magnitude of shifting can be determined based on the encoded convolution kernel data by looking up a table. For example, suppose the quantization set is $\{2, 0, 2^{-1}, 2^{-2}, 2^{-3}\}$, the shift table is $\{1, 0, -1, -2, -3\}$, and the quantized weight data '2' is encoded to '0', then '1' is obtained through looking up the table, and right shift by 1 bit performed.

Figure 5:
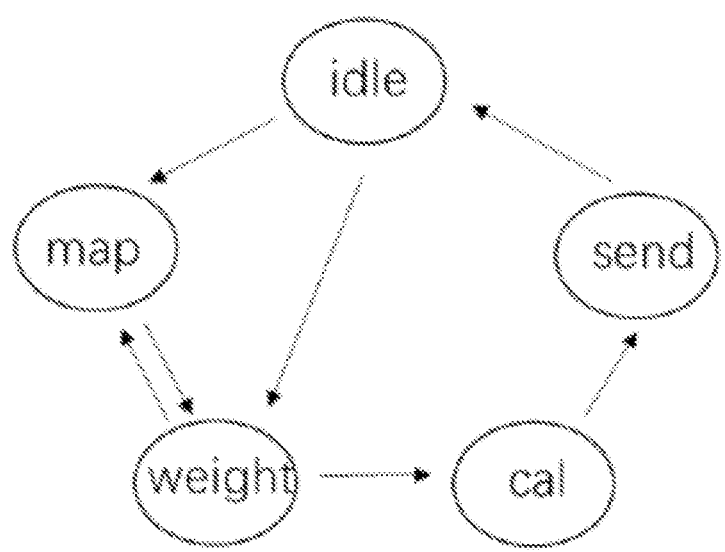
FIG. 5 is a schematic diagram of switching among the working states of the hardware accelerator by the configurable state controller.

As shown in FIG. 5, the accelerator has five working states during operation, and the working states are switched by the configurable state controller. The five working states are: waiting state (idle), input data sending state (map), convolution kernel data sending state (weight), data calculation state (cal), and calculation result sending state (send). The accelerator enters into the waiting (idle) state and waits for a state signal (flag) after it is initialized; the accelerator enters into the input data sending state when the flag is 001, or enters into the convolution kernel data sending state when the flag is 010, or enters into the data calculation state when the flag is 10000. After the calculation is completed, the accelerator automatically enters into the calculation result sending state, and then returns to the waiting state and waits for the next data writing after the calculation result is sent.

Input data sending (map) state: when the flag is 001, the accelerator reads data from the DDR via the AXI-4 bus, reads 16 rows of data from the input feature map and caches the data in the input cache area; since the input cache area is designed in the form of a row cache area, 16 data items can be outputted in parallel from 16 row cache areas of the input cache area and inputted in parallel to the input sub-cache area of each row in the PE array in a clock cycle, and the data is shifted to the right in the PE array each clock cycle.

Convolution kernel data sending (weight) state: when the flag is 010, the accelerator reads 16 convolution kernel data items (weight data after power exponential quantization) from the DDR and stores them in the weight cache area, encodes the data in the weight index area to obtain a weight index, and stores the weight index in the weight index cache area. In a clock cycle, the weight index cache area outputs 16 data items in parallel to the 16 PE units for each column in the PE array, and finally the data is cached in the weight index sub-cache areas of the PE units.

Data calculation (cal) state: when the flag is 010, the accelerator locks up the shift table according to the position information represented by the weight data in the weight index sub-cache areas to determine the direction and magnitude of input data shifting; the calculation of all data is completed after the shift operation is carried out for (3*3*number of input channels) times; then the accelerator will enter into the calculation result sending state in the next clock cycle.

Calculation result sending (send) state: the calculation result is read from 16 calculation result cache areas sequentially, the data item in the first output channel in each calculation result cache area is taken out, and every four data items are assembled into a 64-bit output data item, which is sent via the AXI-4 bus interface to the external memory DDR; in that way, all data in the 16 output channels are sent sequentially to the external memory DDR, then the accelerator returns to the waiting (idle) state.

The examples are provided here only to illustrate the technical idea of the present invention, and should not be used to limit the scope of protection of the present invention. Any modification made on the basis of the technical scheme according to the technical idea proposed by the present invention falls into the scope of protection of the present invention.

What is claimed is:

1. A deep neural network hardware accelerator based on power exponential quantization, comprising:
    an input cache, configured to cache an input feature map data read from an external memory,
    a weight cache, configured to cache a convolution kernel weight data in a power exponent form read from the external memory,
    an encoder, configured to encode the convolution weight data to obtain a weight index value that indicates whether the convolution weight data is positive or negative and indicates a position information of the convolution weight data in an ordered quantization set,
    a weight index cache, configured to cache the weight index value that indicates whether the convolution kernel weight data is positive or negative and indicates the position information of the convolution kernel weight data in the ordered quantization set, a processing element (PE) array, configured to read the input feature map data from the input cache and the weight index value from the weight index cache, to search in a shift table according to the position information of the weight index value in the ordered quantization set to determine a shift direction and a number of bits, then to perform a shift operation for the input feature map data and to output a result of the shift operation, an output cache area, configured to cache the result of the shift operation outputted from the PE array, and a state signal generating circuit, configured to generate a switching instruction for switching the deep neural network hardware accelerator among a waiting state, a input data sending state, a convolution kernel data sending state, a data calculation state, and a calculation result sending state, wherein the PE array is a systolic array that outputs different points of the same output channel in parallel for each column and outputs the data of different output channels for different columns, and the input feature map data is loaded in the leftmost column of the PE array in an initial clock cycle and the input feature map data is shifted by one step to the right of the current column in each clock cycle after the initial clock cycle, and each of PE units in the PE array comprises:

an input sub-cache area, configured to cache the input feature map data read from the input cache, a weight index sub-cache area, configured to cache the weight index value read from the weight index cache, a flag bit generating circuit, configured to read the input feature map data from the input sub-cache area and read the weight index value from the weight index sub-cache area, to generate a flag bit for an inversion operation according to whether the convolution weight data is positive or negative, to search for a shift data according to the position information of the convolution weight data in the ordered quantization set and to generate a flag bit for corresponding shift direction, a first multiplexer, wherein an address input terminal of the first data selector is configured to receive the flag bit for the inversion operation, a data input terminal of the first data selector is configured to receive the input feature map data, and another data input terminal of the first data selector is configured to receive an inverse value of the input feature map data, wherein the first data selector is configured to output the input feature map data if the convolution weight data is positive and to output the inverse value of the input feature map data if the convolution weight data is negative, a second multiplexer, wherein an address input terminal of the second data selector is configured to receive the flag bit for shift direction and a data input terminal of the second data selector is configured to receive the shift data, wherein the second data selector is configured to output an instruction for left shifting of the shift data if the shift data is positive and to output an instruction for right shifting of the inverse value of the shift data if the shift data is negative, and a shift circuit, configured to receive output signals from the first data selector and the second data selector, and to perform a shifting operation on the input feature map data or the inverse value of the input feature map data according to the instruction outputted from the second data selector.

2. The deep neural network hardware accelerator based on power exponential quantization according to claim 1, wherein the deep neural network hardware accelerator further comprises an AXI-4 bus interface, the input cache and the weight cache read the input feature map data and the convolution kernel weight data in the power exponent form from the external memory via the AXI-4 bus interface.

3. The deep neural network hardware accelerator based on power exponential quantization according to claim 1, wherein both the input cache and the output cache area have a row cache structure that contains n+m row cache areas respectively, the PE array reads n rows of data from the input cache for performing the shift operation, and the input cache reads m rows of the input feature map data from the external memory and loads the m rows of the input feature map data to the remaining m row cache areas at the same time, wherein n is the number of rows of the input feature map divided into blocks, and m is the step size of the convolution kernel.

4. The deep neural network hardware accelerator based on power exponential quantization according to claim 1, wherein the ordered quantization set stores absolute values of all convolution kernel weight data after power exponential quantization.

5. The deep neural network hardware accelerator based on power exponential quantization according to claim 2, wherein the data bit width of the AXI-4 bus interface is greater than the bit width of single convolution kernel weight data or input feature map data.

6. The deep neural network hardware accelerator based on power exponential quantization according to claim 4, wherein the shift table is composed of sequentially arranged power exponents of the elements of the ordered quantization set.

* * * * *